(12) United States Patent
Amrine, Jr. et al.

(10) Patent No.: US 8,398,109 B2
(45) Date of Patent: Mar. 19, 2013

(54) HEAVY-DUTY TRAILER

(75) Inventors: James M. Amrine, Jr., Ann Arbor, MI (US); David Coates, Washington, MI (US)

(73) Assignee: Altair Engineering, Inc., Troy, MI (US)

( * ) Notice: Subject to any disclaimer, the term of this patent is extended or adjusted under 35 U.S.C. 154(b) by 151 days.

(21) Appl. No.: 13/004,417

(22) Filed: Jan. 11, 2011

(65) Prior Publication Data
US 2011/0175397 A1 Jul. 21, 2011

Related U.S. Application Data

(60) Provisional application No. 61/295,381, filed on Jan. 15, 2010.

(51) Int. Cl.
*B62D 53/06* (2006.01)
(52) U.S. Cl. ............... 280/441.2; 280/418.1; 280/490.1; 296/184.1
(58) Field of Classification Search .............. 296/184.1; 280/407.1, 481.1, 423.1, 490.1, 441.2
See application file for complete search history.

(56) References Cited

U.S. PATENT DOCUMENTS

| | | | | |
|---|---|---|---|---|
| 1,366,216 | A * | 1/1921 | Scanlan | 172/260 |
| 1,471,548 | A * | 10/1923 | Clement | 280/475 |
| 1,655,351 | A * | 1/1928 | Altgelt | 280/474 |
| 1,870,689 | A * | 8/1932 | Remde | 414/537 |
| 2,097,113 | A * | 10/1937 | Bradley | 280/837 |
| 2,452,789 | A * | 11/1948 | Pike | 414/537 |
| 2,605,916 | A * | 8/1952 | Martin | 414/481 |
| 2,611,496 | A * | 9/1952 | Martin | 414/537 |
| 2,617,547 | A * | 11/1952 | Pridy | 414/746.2 |
| 2,653,827 | A * | 9/1953 | Manning | 280/43.11 |
| 2,687,225 | A * | 8/1954 | Martin | 414/481 |
| 2,774,497 | A * | 12/1956 | Martin | 414/481 |
| 2,774,613 | A * | 12/1956 | Martin | 280/441.2 |
| 3,004,772 | A * | 10/1961 | Bohlen et al. | 280/418.1 |
| 3,096,993 | A * | 7/1963 | McKay | 280/81.1 |
| 3,380,607 | A * | 4/1968 | Dale | 414/477 |
| 3,419,169 | A * | 12/1968 | Clayton | 414/481 |
| 3,598,421 | A * | 8/1971 | Mason, Jr. | 280/423.1 |
| 3,756,443 | A * | 9/1973 | Verschage et al. | 414/481 |
| 3,894,645 | A | 7/1975 | Verschage | |
| 4,078,684 | A * | 3/1978 | Hasenberg et al. | 414/481 |
| 4,103,793 | A * | 8/1978 | Weaver | 414/481 |
| 4,164,297 | A * | 8/1979 | Dorwin | 414/481 |
| 4,262,923 | A * | 4/1981 | Weir | 280/415.1 |
| 4,296,941 | A * | 10/1981 | Van Wassenhove | 280/441.2 |
| 4,302,022 | A * | 11/1981 | Schoeffler et al. | 280/43.19 |

(Continued)

FOREIGN PATENT DOCUMENTS

JP 2008007088 A 1/2008
KR 1020040009093 A 1/2004

OTHER PUBLICATIONS

Notification of Transmittal, International Search Report and the Written Opinion of the International Searching Authority dated Oct. 21, 2011 from the corresponding International Application No. PCT/US2011/021036.

*Primary Examiner* — Anne Marie Boehler
*Assistant Examiner* — Maurice Williams
(74) *Attorney, Agent, or Firm* — Young Basile

(57) ABSTRACT

A heavy duty wheeled trailer for use in towing the trailer behind a vehicle. The trailer includes an adjustable height tow connection point to adjust and connect to different types of tow vehicles while maintaining the front deck substantially parallel to the trailer main deck. The trailer further includes a modular support frame allowing the trailer to be easily scaled in length and performance capabilities through removal or addition of modular frame cells.

10 Claims, 7 Drawing Sheets

U.S. PATENT DOCUMENTS

| | | | |
|---|---|---|---|
| 5,246,241 A * | 9/1993 | Baver | 280/407.1 |
| 5,566,964 A * | 10/1996 | Leonard | 280/417.1 |
| 6,036,207 A * | 3/2000 | Oehlerking et al. | 280/149.2 |
| 6,042,137 A * | 3/2000 | McIntosh | 280/490.1 |
| 6,286,857 B1 | 9/2001 | Reese et al. | |
| 6,352,277 B1 | 3/2002 | Timmings | |
| 6,402,176 B1 | 6/2002 | Timmings | |
| 6,562,412 B1 | 5/2003 | Fontaine | |
| 6,941,875 B2 * | 9/2005 | Norton et al. | 105/397 |
| 7,114,740 B1 | 10/2006 | Mann et al. | |
| 7,257,904 B1 | 8/2007 | Brown et al. | |
| D552,515 S | 10/2007 | Prosser et al. | |
| 7,296,817 B1 | 11/2007 | Mann et al. | |
| 7,395,591 B2 | 7/2008 | Prosser et al. | |
| 7,448,639 B1 | 11/2008 | Mann et al. | |
| 7,490,845 B1 | 2/2009 | Rhodes et al. | |
| 7,516,974 B1 | 4/2009 | Mann et al. | |
| 7,530,589 B1 | 5/2009 | Mann et al. | |
| 7,568,754 B2 | 8/2009 | Adams | |
| 7,571,953 B2 | 8/2009 | Adams | |
| 7,658,587 B1 * | 2/2010 | Dierks et al. | 414/484 |
| 8,210,557 B2 * | 7/2012 | Schneider | 280/417.1 |
| 2003/0044265 A1 | 3/2003 | French et al. | |
| 2005/0121260 A1 * | 6/2005 | Leng | 182/156 |
| 2008/0084097 A1 * | 4/2008 | Botting | 297/215.12 |
| 2009/0160216 A1 * | 6/2009 | Gosselin et al. | 296/184.1 |
| 2010/0219019 A1 * | 9/2010 | Sedlack, II | 182/194 |

\* cited by examiner

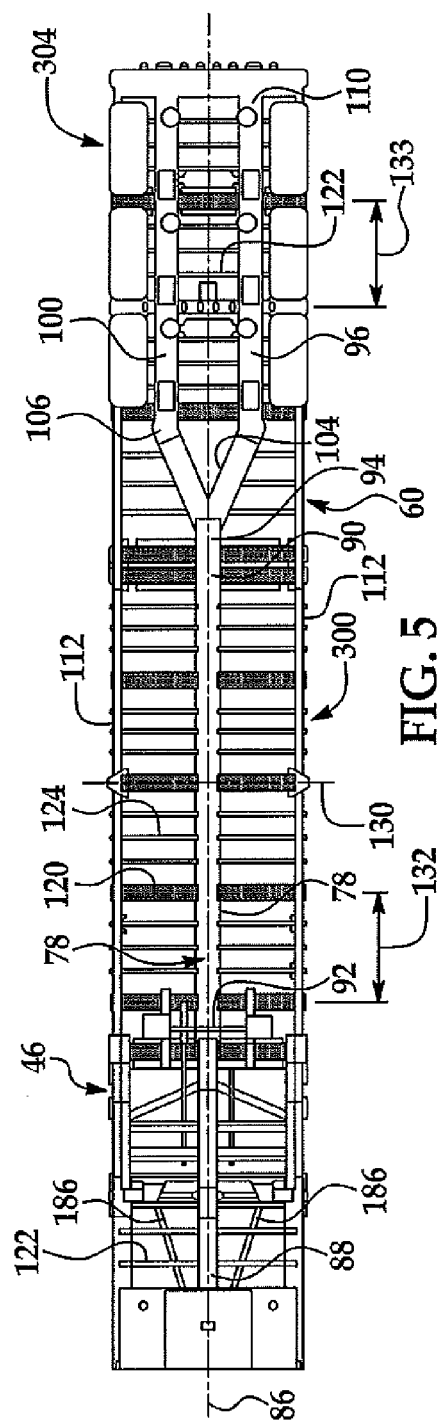
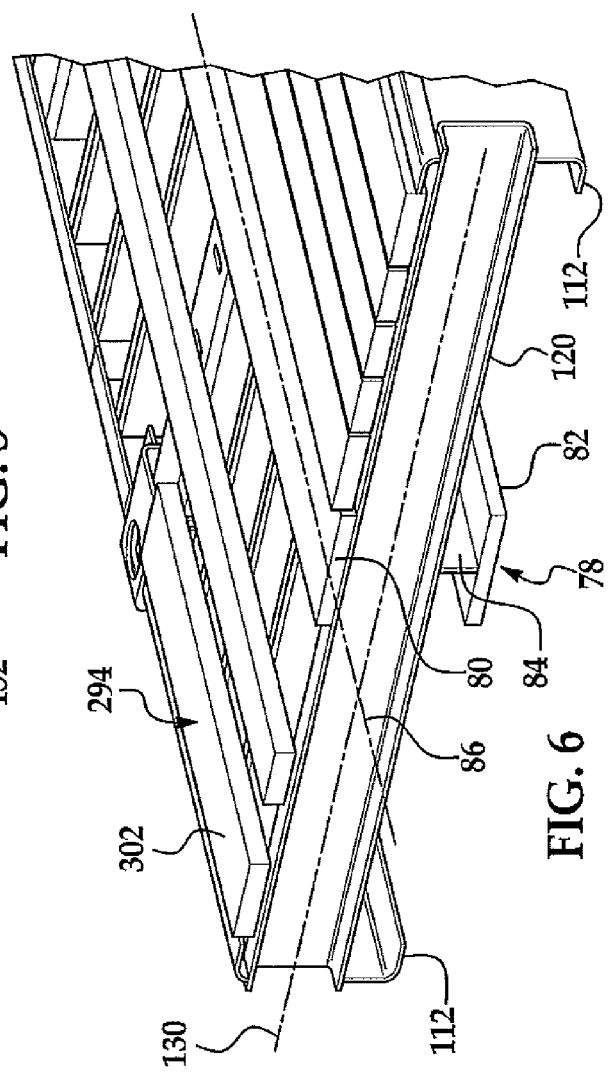

HEAVY-DUTY TRAILER

CROSS-REFERENCE TO RELATED APPLICATIONS

This application claims priority benefit to U.S. Provisional Patent Application No. 61/295,381 filed Jan. 15, 2010 the entire contents of which are incorporated herein by reference.

STATEMENT REGARDING FEDERALLY SPONSORED RESEARCH OR DEVELOPMENT

This invention was made with government support under contract awarded by US Army TACOM through FSSI (now WTSI). The government has certain rights in the invention.

TECHNICAL FIELD

This invention is generally in the filed of heavy duty utility trailers used with tractor trailer trucks and other large utility vehicles.

BACKGROUND

Utility trailers used with commercial tractor trailer trucks are common sights on roads and highways. These trailers are fundamental equipment for moving large or voluminous cargo from place to place. These trailers can be closed-box-type trailers or flatbed-type trailers for hauling heavy machinery, for example, earth moving equipment.

Difficulties exist in present open-flatbed-type designs in many important areas reducing their utility and capabilities. Existing designs often have a fixed-height kingpin or fifth wheel connection point to the vehicle that pulls the trailer. This renders a particular trailer only useful for a particular style or class of vehicle which accommodates that connection point height. Other disadvantages of present designs include inefficiencies in design and manufacturing which adds to the inflexibility in use as well as lower performance capabilities.

It would be beneficial for a trailer to improve on these deficiencies in adaptability to accommodate different towing vehicles while improving the trailer's capabilities and performance. It would further be beneficial for a trailer to improve on the design and manufacturing to reduce the number of special or custom components that are used in present designs which, for example, are used in one type of trailer that are not suitable to be used in other trailer designs. It would be advantageous for a trailer to include the above advantages while increasing the payload capabilities, robustness of design and durability for use in extreme duty situations in the harshest environments.

SUMMARY

A heavy duty wheeled trailer for use in towing behind vehicles and supporting and transporting selected cargo thereon. The trailer includes a front deck, a main deck and a transition portion that is selectively and independently rotatable relative to the front deck and the main deck for adjusting the position and vertical height of the trailer tow connection point, for example, a fifth-wheel kingpin.

In one example of the invention, the transition portion includes a four bar link mechanism which is connected on opposing ends of the links to the front deck and main deck. Through selected disengagement of the transition portion from the main deck, the transition portion is rotatable about pivot points to change the angular position and orientation of the transition potion relative to the main deck. Through selected disengagement of the front deck from the transition potion, the front deck is rotatable about pivot points to change the angular position of the front deck relative to the transition portion. This allows selected positioning and orientation of the front deck relative to the transition portion and the main deck to selectively adjust the position and height of the trailer tow connection point to accommodate many different types and sizes of tow vehicles greatly increasing the usability of the trailer.

In one example of the trailer, the trailer includes a unique frame having a double "Y" support beam structure. The first "Y" utilizes truss members connected to structure supporting the trailer tow connection point to further distribute the loads on the trailer frame imposed on the connection point, for example a fifth wheel kingpin. The second "Y" utilizes a first, second and third support beam. The second and third support beams first extend rearward at an angle with respect to the first beam and then parallel to the first beam toward the rear of the trailer to connect to the trailer suspension.

In one example of the invention, a cam member and cam dial are used to select a predetermined position and orientation of the front deck with respect to the transition portion. In one example, the front deck is positioned to be substantially horizontal and parallel to the main deck.

In one example of the invention, the frame consists of modular cells having commonly configured first and second cross members that extend transverse to the support beams and side rails. The respective commonality of the first and second cross members allow the trailer to be scaled in length and performance capabilities at the point of manufacture and depending on the method of construction, out in the field.

In one example of a method of adjusting the tow connection point on a towable trailer, the first transition portion is disengaged from one of the main deck and front deck allowing relative rotational movement of the transition portion to the respective main deck or front deck. The first transition portion is then disengaged from the other of the main deck or front deck allowing relative rotational movement of the transition portion to the other deck. This selected rotational movement permits the trailer tow connection point to be positioned at the selected height and orientation to the selected tow vehicle. The transition portion is then locked into position relative to the front deck and the main deck to secure the tow connection point at the desired positional location.

BRIEF DESCRIPTION OF THE DRAWINGS

The description herein makes reference to the accompanying drawings wherein like reference numerals refer to like parts throughout the several views, and wherein:

FIG. 5 is a bottom view of the trailer shown in FIG. 3;

FIG. 6 is cut-away perspective view taken through a cross-member and showing some partial decking;

DETAILED DESCRIPTION OF EMBODIMENTS OF THE INVENTION

Figure 1:
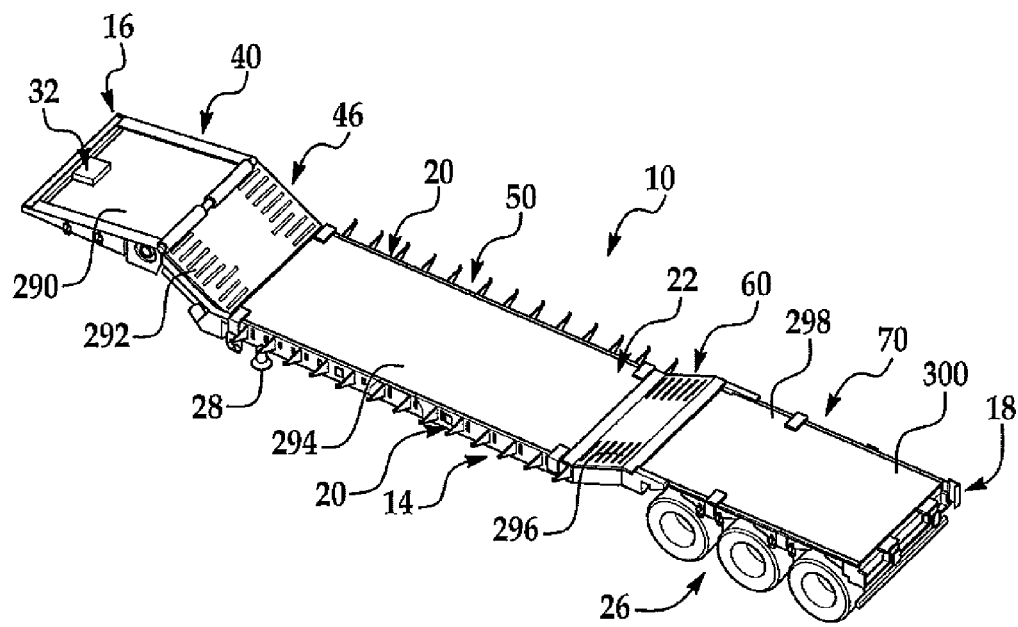
FIG. 1 is a perspective view of an example of the inventive trailer showing a "low-boy" type of trailer configuration.
Figure 2:
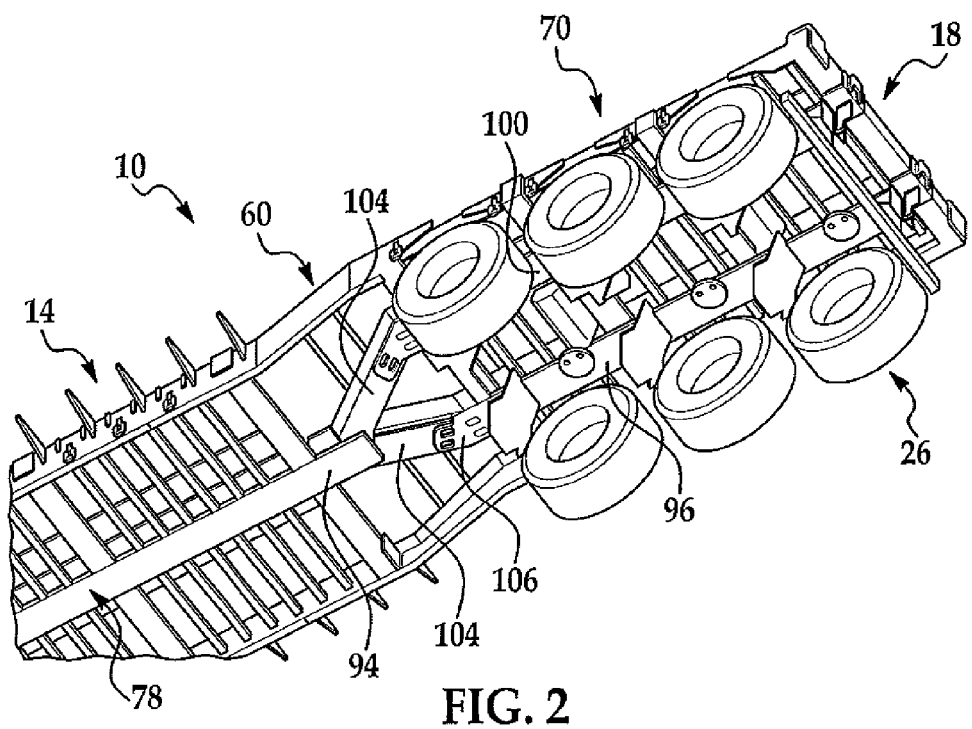
FIG. 2 is a partial underside perspective view showing the rear suspension of the trailer shown in FIG. 1.
Figure 3:
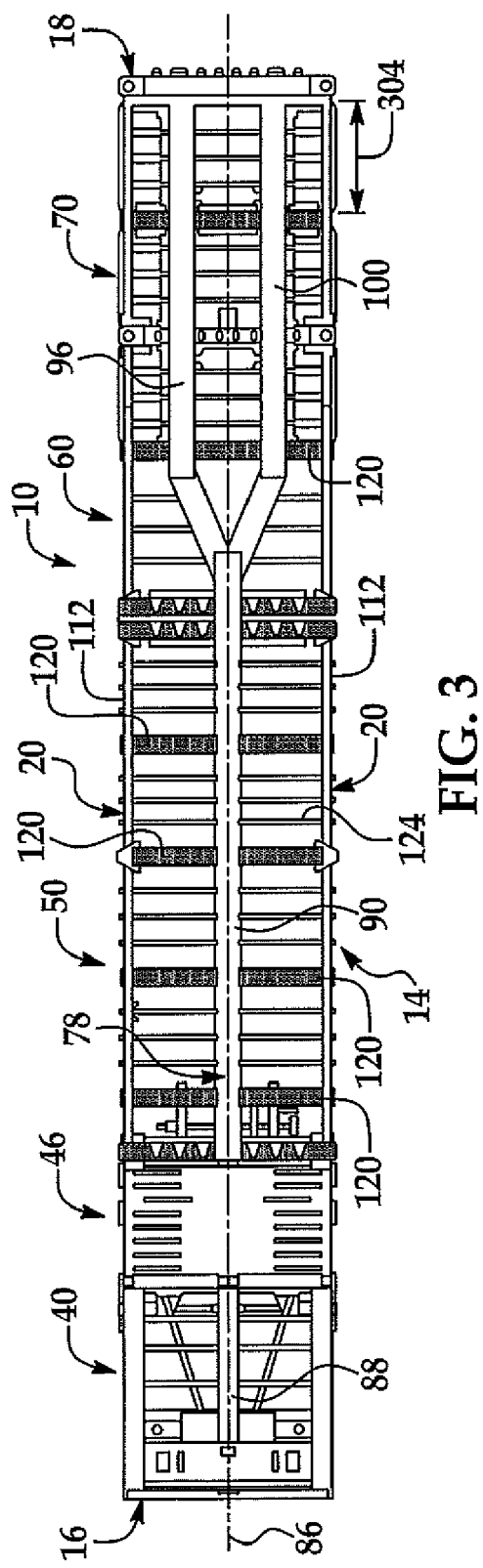
FIG. 3 is a plan view of an example of an alternate trailer design showing a flatbed configuration with the trailer decking removed to show the general frame components.
Figure 4:
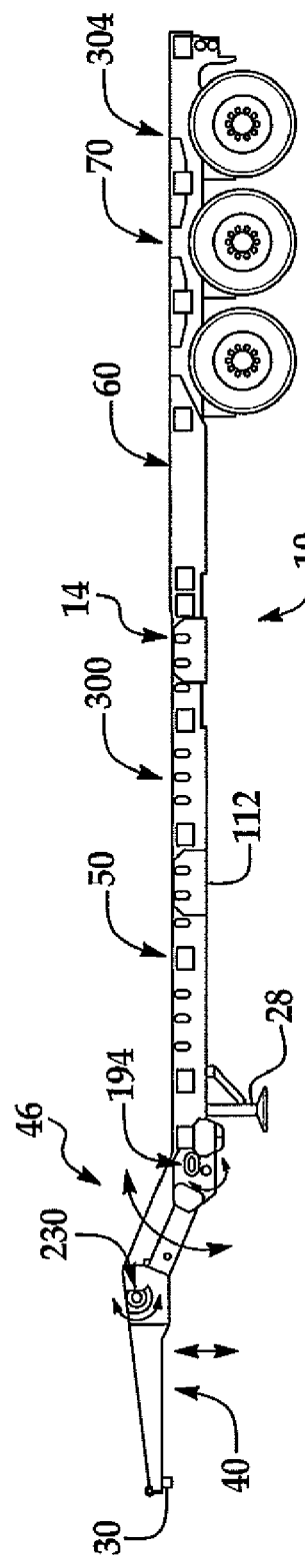
FIG. 4 is a side view of the trailer shown in FIG. 3.

Several examples of the inventive heavy-duty trailer 10 and method of use are shown in FIGS. 1-12. In FIGS. 1 and 4, two different configurations are illustrated. FIG. 1 shows an exemplary "low-boy" style trailer having a main central deck portion positioned lower than the rear deck. FIG. 4 shows an alternate "flatbed" configured trailer having the main central deck portion at the same height as the rear deck.

Referring to the examples shown in FIGS. 1 through 4, trailer 10 includes a support frame 14, a front end 16 and a rear end 18 separated by sides 20. A deck 22 covers at least the main deck and rear deck areas. The exemplary trailer 10 includes wheels 26 (six shown), landing gear 28 and a trailer tow connection point 30, for example a kingpin (shown in FIG. 4) for fifth-wheel-type connection to a tractor trailer truck or other towing vehicle (not shown). Other types of trailer tow connectors or connection points other than kingpin 30 may be used, for example, a heavy duty ring, dual kingpins, a receptacle to receive a ball mounted to the tow vehicle, to suit the particular application as known by those skilled in the art.

As best seen in the example shown in FIG. 1, trailer 10 includes a front deck 40 defining the front end 16 positioned closest to the connection point to the towing vehicle and a first transition portion 46 positioned rearward of and connected to a rear portion of the front deck 40. A main deck portion 50 is positioned rearward of and connected to the first transition potion 46. A second transition portion 60 is positioned rearward of the main deck 50 and is connected to the main deck and a rear deck 50. In the example shown, the first 46 and second 60 transition portions are angled downward from the front 40 and rear 70 decks respectively to position the main deck at a lower height than the front and rear decks to form a "low-boy" trailer configuration. In the example shown, first transition portion is selectively rotatable with respect to the front 40 and main 50 deck portions as is described in further detail below.

Referring to FIGS. 3-5, and example of a support frame 14 for trailer 10 is shown. As best seen in FIG. 4, these figures illustrate an alternate type of trailer 10 configured in a "flatbed" configuration wherein the main deck portion 50 is positioned at substantially the same height as the rear deck portion 70.

As best seen in the example shown in FIGS. 2 through 6, support frame 14 includes a first support beam 78. In the preferred example illustrated, first support beam 78 is a single beam member positioned centrally down a longitudinal axis 86 of trailer 10. In a preferred configuration best seen in FIG. 6, first support beam 78 is an I-beam having an upper flange 80 and a lower flange 82 separated by a web 84.

As will be described in more detail below, the preferred example first support beam 78 includes a first portion 88 which is centrally positioned below and supports the front deck 40 and second portion 90 which supports the main deck 50 as best seen in FIGS. 3 and 5. In the main deck 50 area, beam 78 includes a first end 92 positioned toward the first transition portion 46 and a second end 94 positioned toward the second transition portion 60. In the example, first support beam 78 is not a continuous beam across the first transition portion 46 as best seen in FIG. 7.

As best seen in the examples shown in FIGS. 2, 3 and 5, frame 14 includes a second beam support 96 and a third beam support 100 which are rigidly connected to the second end 94 of first beam 78 at a first end 104. In a preferred example, second 96 and third 100 beams are also in an I-beam configuration and are connected the first ends 104 by slightly lowering the beams so the corresponding upper and lower flanges overlap (not shown) to provide an improved and robust connection to first beam 78. Additional reinforcement gussets 106 may be used where necessary to further strengthen the connection.

In the preferred example, second 96 and third 100 beams are positioned at an angle from the longitudinal axis 86 to form a "Y" configuration below the second transition portion 60 and then extend rearward substantially parallel to axis 86 as generally shown. As best seen in FIG. 2, the second 96 and third 100 beams provide rigid attachment points for the wheels 26 and other suspension components such as traditional leaf springs, pneumatic springs and other suspension components and sensors (not shown) known by those skilled in the art.

Figure 7:
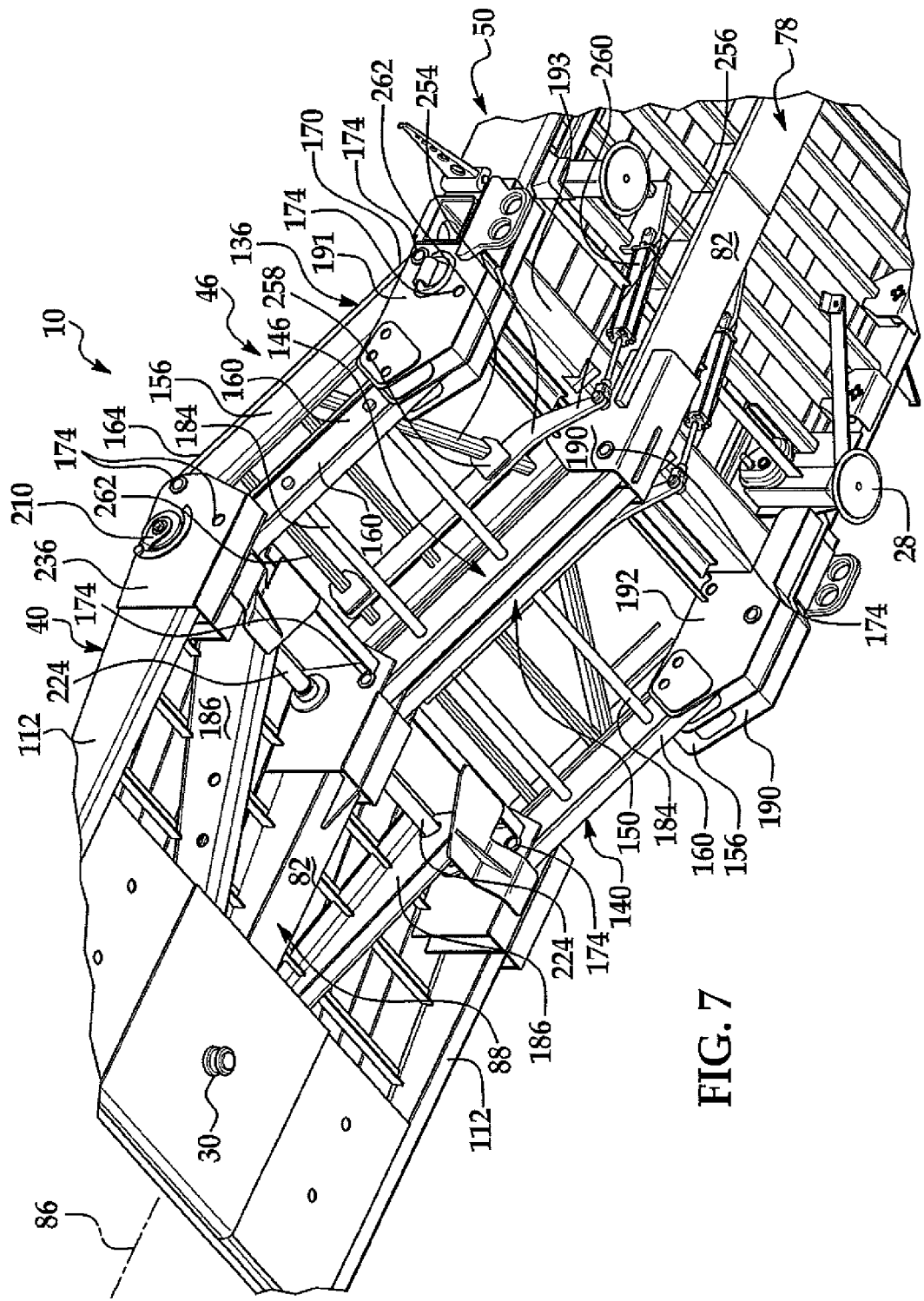
FIG. 7 is a partial perspective view showing the underside of the front portion of the trailer in FIG. 1.

Referring to FIGS. 3, 5 and 7 a "Y" support configuration may also be used near the tow connection point 30. In this example, two angularly opposed structural truss members 186 are shown. Truss members 186 are connected to a lateral structural cross member (not shown) positioned adjacent to the trailer connection point, for example kingpin 30) and extend angularly outward toward side rails 112 as generally shown. It has been discovered that use of angularly diverging structural truss members 186 is highly effective in transferring and widely distributing loads away from kingpin 30 and first support beam 78 toward structural side rails 112 significantly stabilizing frame 14 and increasing the load bearing capabilities of trailer 10.

In the preferred examples illustrated, first 78, second 96, third 100 beam supports and truss members 186 are made from steel, but may be made from cast iron and other non-ferrous metals, such as aluminum or other materials. The first 78, second 96, third 100 beams and truss supports 186 may also be configured in different forms than I-beams and may be in different numbers and positions respecting the other components of frame 14 other than as shown to suit the particular application and performance requirements of trailer 10.

In the examples shown in FIGS. 3-6, frame 14 further includes side rails 112 positioned laterally distant along lateral axis 130 from, and substantially parallel to, longitudinal axis 86. In a preferred example best seen in FIG. 6, side rails 112 are C-shaped in section opening inward toward longitudinal axis 86. Side rails 112 extend along front deck 40, main deck 50 and rear deck 60, but may not be continuous in the first 46 and second 60 transition areas as described for first beam 78. Side rails 112 may be made from multiple pieces or sections and are preferably rigidly connected through fasteners or through welding or other processes known by those skilled in the art.

In the examples illustrated, frame 14 further includes several first cross-members 120 and second cross-members 124 which extend along the lateral axis 130 substantially perpendicular to longitudinal axis 86. As best seen in FIG. 6, first cross-members 120 are positioned through apertures in the first beam 78 web 84 and side rails 112 to remain continuous across the full width of the trailer 10. In a preferred configuration, first cross-members 120 are relatively large square or rectangular-shaped sections having an upper flange or portion that is positioned to butt up against the underside of first beam 78 upper flange 80 and rigidly connect thereto through seam welding, stitch welding, mechanical fasteners or other attachment methods known by those skilled in the art. Several first cross-members 120 are used and are positioned from one another along longitudinal axis 86 as generally shown.

In the examples, second cross-members 124 are positioned between first cross-members 120 and equally extend through apertures in first beam web 84 and side rails 112 as first cross-members 120. In a preferred configuration, second cross-members 124 are closed rectangular-shaped in section and are rigidly secured to at least first beam 78 and side rails 112. As best seen in FIGS. 3 and 5, several second cross-members 124 are positioned between two adjacent first cross members 120. In a preferred example, pairs of first cross-members 120 and the second cross-members 124 positioned between, form successive and similarly constructed modular cells 132 along main deck 50 and modular cells 133 along rear deck 70 positioned along longitudinal axis 86. Through the use of modular cells 132 and 133, frame 14 and trailer 10 can be relatively easily scaled in length at the point of manufacture, or out in the field if removable fasteners are used to connect the sections or cells, to suit the particular application or performance requirements. Similar modular cells may be used for front deck 40 (not shown).

The first 120 and second 124 cross-members are preferably made from steel, but may be made from other ferrous and non-ferrous materials, and in alternate section configurations, to suit the particular application and performance requirements as known by those skilled in the art.

Referring to the example shown in FIG. 7, trailer 10 and first transition portion 46 preferably include a four-bar linkage which allows the first transition portion 46 to independently pivot or rotate with respect the front deck 40 and main deck 50 to raise and lower first deck 40 with respect to main deck 50 as further described below.

As best seen in the example shown in FIG. 6, the height of the side rails 112 and first support beam 78 are relatively about the same size. In prior trailer designs, it was common that the two large parallel I-beams were needed for central support or that a much larger (higher in section) central support I-beam was needed which was much larger than the side rails. With such a tall center support beam, the prior designs drastically reduced the ground clearance of the trailer which could be significant in certain non-highway application such as for military use. Through testing of the exemplary and inventive trailer, it was discovered that use of the generally described support beams 78, 96 and 100, side rails 112 and first 120 and second 124 cross-members and truss members 186 (best seen in FIG. 7 and described in further detail below), that the shorter height support beam 78 could be used while the load bearing capacity of the trailer and torsional robustness of the frame 14 were substantially improved over prior designs.

Figure 10:
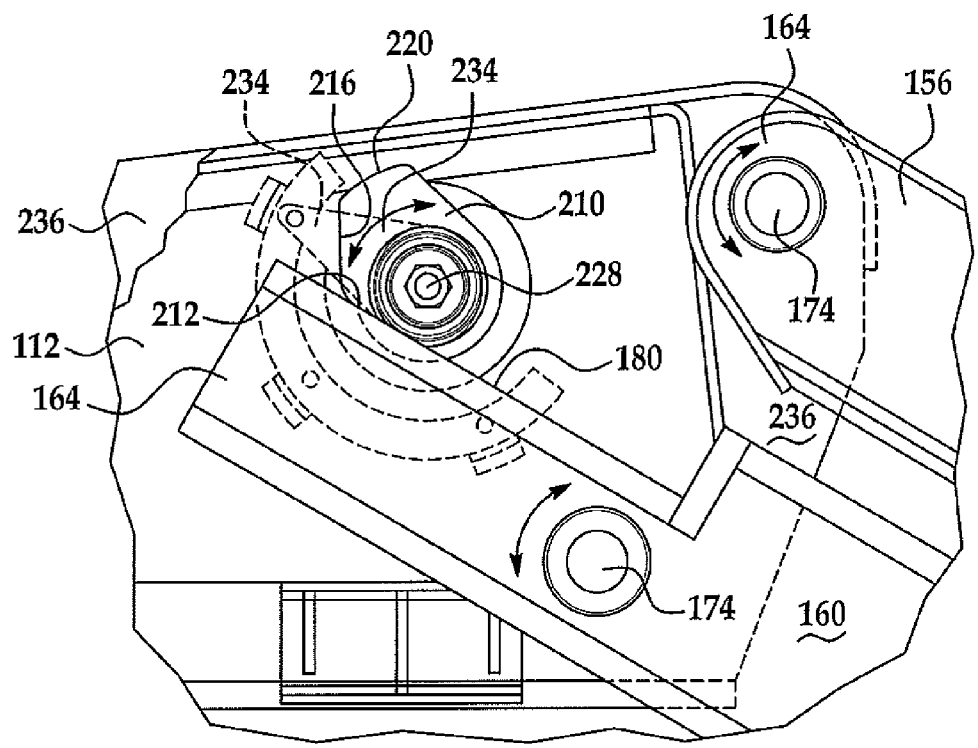
FIG. 10 is a schematic cut-away side view of an example of a cam mechanism useable with the cam lever mechanism in FIG. 9 and useful for the exemplary trailers shown in FIGS. 1 and 3.

In the preferred example shown in FIG. 7, first transition portion 46 includes a first 136, second 140, third 146 and fourth 150 connecting arms laterally spaced from one another along lateral axis 130. Each connecting arm 136, 140, 146 and 150 includes a first or upper link 156 and a second or lower link 160 positioned below the first link as generally shown. Each link includes a front end 164 positioned toward front deck 40 and a rear end 170 positioned toward the main deck 50. Each of the link rear ends 170 are pivotally connected at a pivot 174 to an adjustment bracket 190 best seen in FIGS. 7, 8 and 10. Each link is pivotally connected at a pivot 174 at the front ends 164 to bracket 236 as best seen in FIGS. 7 and 10. As shown in the example in FIG. 7, additional connecting rods 184 and cross members 262 may connect the respective links of first 136 and third 146, and the second 140 and fourth 150 connecting arms, as generally shown. Additional or other cross-members and structural reinforcements known by those skilled in the art may be used.

In the preferred example shown in FIG. 7, there are four connecting arms which pivot with respect to the front deck 40 and main deck 50. This allows the first transition portion 46 to rotate relative to the main deck 50 to raise and lower the position of the entire front deck 40 relative to the main deck 50 to change the height of the front deck 40 and kingpin 30 to accommodate different height connection points, for example fifth-wheel connection points, on a towing vehicle (not shown). In a preferred example, the first transition portion 46 allows the first deck 40 to remain substantially horizontal and/or parallel to the main deck 50 over the entire path of selected travel between a low, medium and a high position as more fully described below. Other angular positions and or movements for front deck 40 may be made as known by those skilled in the art to suit the particular application or performance requirements.

Figure 8:
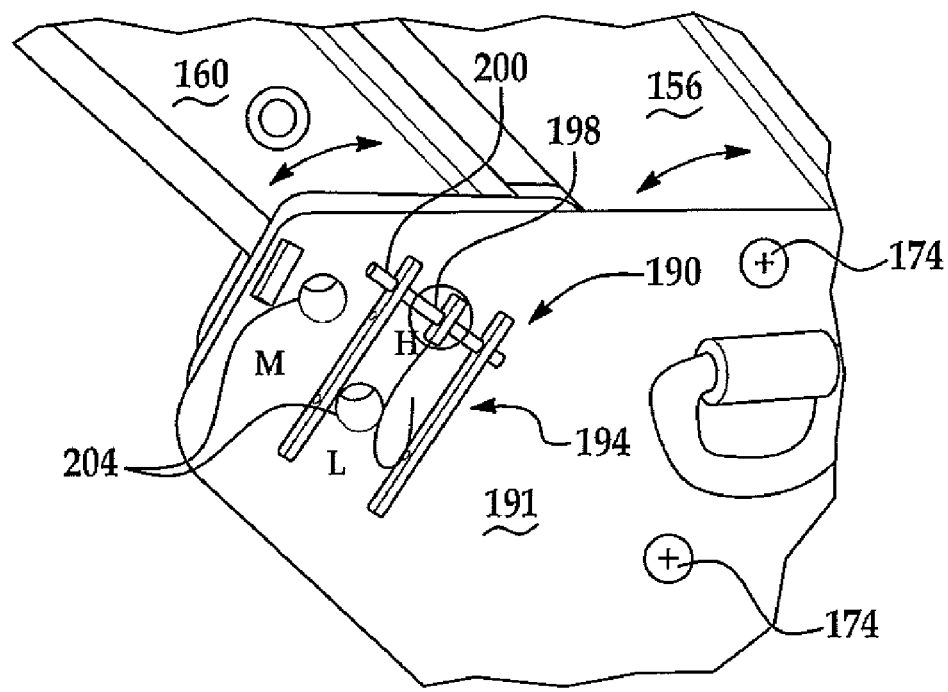
FIG. 8 is a partial side view of an example of an adjusting bracket useful for the exemplary trailers shown in FIGS. 1 and 3.

Referring to FIGS. 7 and 8, an example of an adjustment bracket 190 for selective positioning of the first transition portion 46, and first deck 40, is illustrated. Each bracket 190 is respectively connected to a cross-support 193 and side rail 112 at the front end of the main deck 50. Bracket 190 includes an outer member 191, an inner member 192 and a middle member 195 laterally separated. Positioned between the respective outer 191 and middle member 195 are the first links 156. Positioned between the respective middle member 195 and in the inner 192 member are the second links 160. The respective first 156 and second 160 links may rotate with respect to brackets 190 about pivot points 174.

Referring to FIG. 8, each bracket 190 further may include a locking plate member 194 including three through apertures or stops 204 which extend through the middle 195 and inner member 192. The three apertures or stops 204 provide for three different predetermined angular positions or stops of link 160, and ultimately front deck 40 and tow connection 30, with respect to the main deck 50. Second link 160 includes at least two apertures (not shown) which are so aligned with the respective aperture 204 so that when link 160 is at the desired low, medium or high position, one of the apertures 204 is concentrically aligned with one of the holes in link 160 allowing an elongate locking pin 198 to be positioned through the three concentrically aligned two sets of holes in the outer 191, middle 195 and inner 192 bracket members as well as the aligned aperture in link 160. With the locking pin 198 in place in both brackets 190 positioned on opposite sides of trailer 10, first transition portion 46 is prevented from further angular movement about the lower pivot points 174 in the respective brackets 190. A safety pin 200 is passed through opposing structures in the bracket 190 and pin 198 preventing the pin from axial dislodgment from the apertures.

Figure 9:
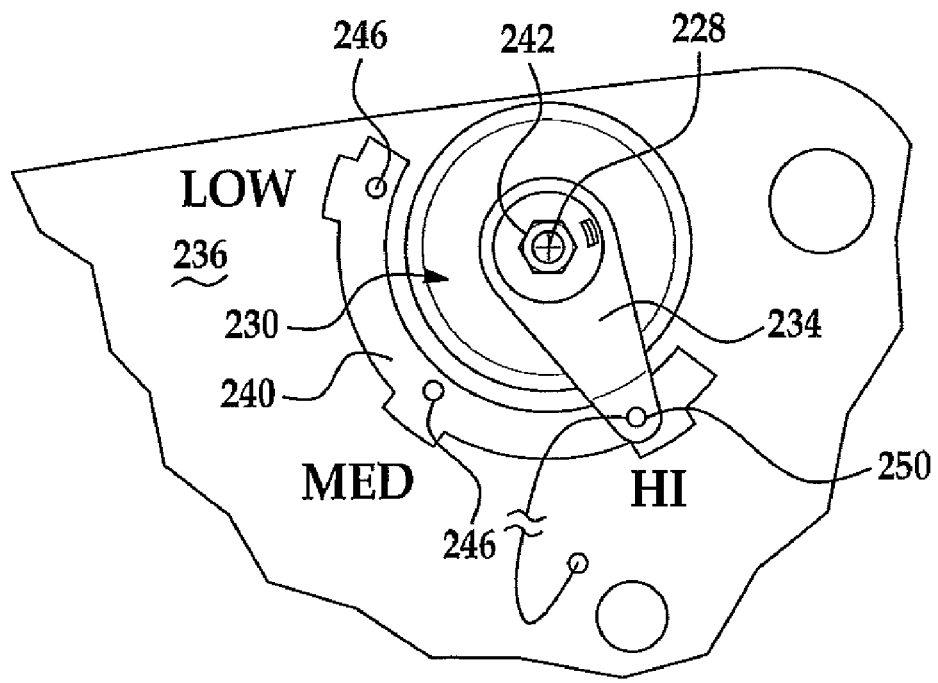
FIG. 9 is a partial side view of an example of a cam lever mechanism useful for the exemplary trailers shown in FIGS. 1 and 3.

Referring to FIGS. 7, 9 and 10, an example of an cam mechanism having an adjustment cam 210 and a cam dial 230 used for adjusting the cam 210 is illustrated. As best seen in FIG. 10, side rail 112 includes an adjustable cam member 210 that is rotatably secured to side rail 112 about a rotational axis 228. Cam member 210 includes a first 212, second 216 and third 220 surface about the perimeter. As illustrated, a front end of second link 160 extends below and beyond the rotational axis 228 and includes a bearing surface 180 facing cam member 210. Cam member first 212, second 216 and third 220 surfaces are designed to selectively contact bearing surface 180 and due to the radial distances of the surfaces with respect to the rotational axis 228, respectively change the position of the front deck side rails 112, and ultimately the front deck 40, with respect to first transition portion 46. As best seen in FIG. 7, each adjustable cam member 210 (four total, one for each second or lower link 160) is rigidly connected to a cam rod 224 that extends through the deck support structure to the opposing cam member on the opposite side rail 112. In a preferred example, the three cam member surfaces are designed to coordinate with the high, medium and low, positions of the link 160 in the adjustment bracket 190 so that the front deck remains substantially parallel with the main deck 50 despite a different angle between link 160 and main deck 50. Adjustment cam 210 is preferably made from steel, but may be made from other materials and take other forms and orientations as known by those skilled in the art. Although three positions of low, medium and high are described and illustrated, it is understood fewer or greater number of positions may be used.

Referring to FIGS. 7 and 9, a cam dial 230 is shown. Cam dial 230 provides means to easily adjust or change the position of the cam 210 and which surface of cam member 210 will be applied to bearing surface 180 of the second link 160. Cam dial 230 includes an adjustment arm fixedly connected to cam rod 224 and a locking ring 240 attached to the outer surface of a bracket 236 spanning the joint between side rail 112 and links 156 and 160. Locking ring 240 includes several apertures 246 (three shown) which correspond to the positions of the cam member 210 so the desired first 212, second 216 or third 220 surfaces are against the bearing surface 180 of link 160. A tethered locking pin 250 is inserted through the appropriate aperture 246 and adjustment arm 234 to lock the cam at the selected position. A nut 242 or other structure may be mounted to the end of cam rod 242 to assist in the turning of the cam rod and cam 210 to the desired position.

Referring to FIG. 7, an example of an actuating mechanism for rotating the first transition portion 46 and front deck 40 is shown. In the example, a pair of pivot arms 254 are positioned on opposite sides of longitudinal axis 86 and are connected to one or more cross braces 262 connected to opposing first links 156 as generally shown. For each pivot arm 254 an actuating cylinder 260 is connected to an end 256 of the arm. On simultaneous actuation of the cylinders 260, the first transition portion 46 is forcibly rotated in the selected direction to change the position of the front deck 40 with respect to the main deck 50 as previously described. In a preferred example, actuating cylinders 260 are hydraulic cylinders powered by a hydraulic pump as further described below. Other actuating systems, such as pneumatic, battery and other power systems, in other configurations, known by those skilled in the art may be used. It is understood that an actuating mechanism is optional as the front deck 40, for example, could be manually raised or lowered to the desired position by, for example, a winch on the tow vehicle with a cable connected to a heady duty D-ring 32 to position the front deck 40 to the desired position until the first transition portion 46 is locked into position as described above.

Figure 11:
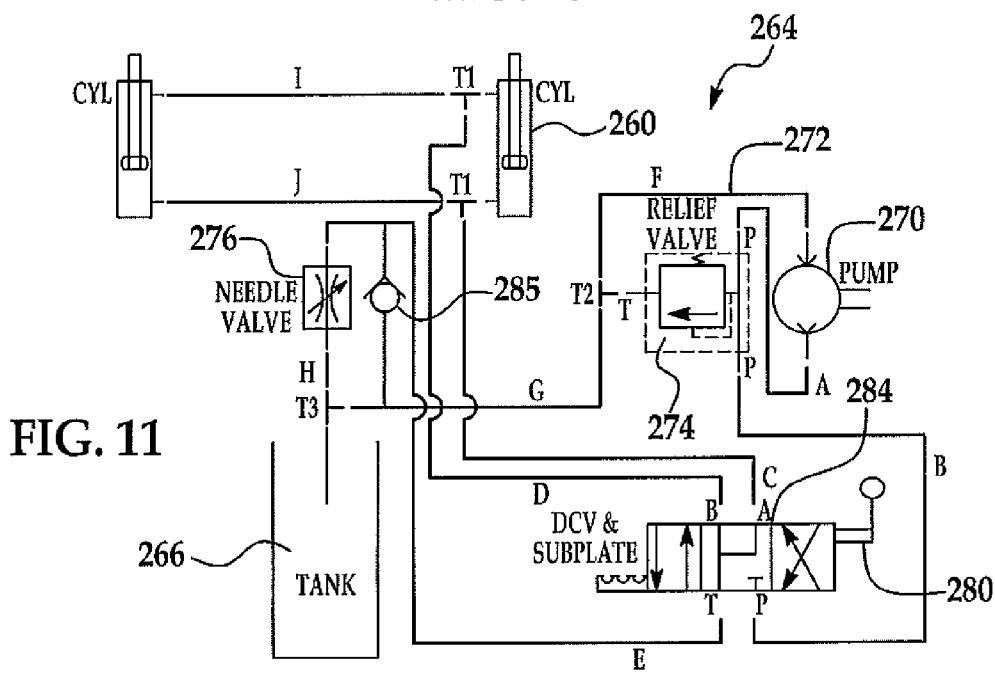
FIG. 11 is a schematic view of an exemplary hydraulic circuit useful for the exemplary trailers shown in FIGS. 1 and 3.

As best seen in FIG. 11, an example of a hydraulic circuit 264 used to actuate and control actuating cylinders 160 is illustrated. In the example, circuit 264 includes a fluid reservoir tank 266, two hydraulic cylinders 260, a hydraulic pump 270 and lines 272 interconnecting the various components. As generally illustrated, a safety valve 274, a needle valve 276 and check valve 285 are used to respectively control any undesired pressure build-up or release conditions that fall outside of the design parameters and those programmed by control system 284. An actuating handle 280 is provided to enable and disable the actuating system. In a preferred example, a three-position handle is used to apply fluid to move the cylinder rams 260 forward, rearward of to halt the flow of fluid to or from the cylinders (neutral). The needle valve 276 is useful to control and prevent a rapid flow of fluid from the cylinders 160 in a condition, for example that the locking pins 198 are removed and the front deck is unsupported allowing gravity to pull down on the front deck. Needle valve 276 would prevent a rapid rotating and falling of the front deck under its own weight. Conversely, check valve 285 is useful to facilitate raising of the front deck, for example manually through a winch and cable connected to a tow vehicle (not shown). In this example, check valve 285 would allow fluid to flow from the reservoir 266 through the check valve 286 to the cylinders 260, thereby bypassing the needle valve to facilitate raising front deck 40 relative to the rest of the trailer. The check valve 285 would not allow fluid flow the other way from the cylinders 260 back to the tank, but rather such fluid would be forced to pass through needle valve 274 for orderly and controlled movement of the front deck 40.

In an alternate example, an on-board or separate manually hand-operated hydraulic or pneumatic device (not shown) could be used similar to a hydraulic jack to reposition the front deck 40 as desired. Other hydraulic circuits, components and configurations may be used by those skilled in the art.

In one example of a "low-boy" configured trailer 10 shown in FIG. 1, the front deck 40 and first transition portion 46 can be articulated and lowered such that the front portion of front deck 40 can be made to touch the ground thereby providing an angular ramp for the intended cargo to be rolled onto the trailer or easily positioned through a fork lift etc. In the alternate example of a flatbed configured trailer shown in FIGS. 3-5, the front deck 40 and first transition portion 46 can be articulated and lowered to a certain level or height through the adjustment bracket 190 and cam 210. Other combinations and features for the articulation and positions of front deck 40 with respect to main deck 50 known by those skilled in the art may be used.

Referring to FIGS. 1, 3 and 6, trailer 10 preferably includes decking positioned on top of the first 120 and second 124 cross-members as generally shown in FIG. 6. Such decking preferably takes the form of removable planks 302 preferably positioned transverse to the cross members along the longitudinal axis 86 and secured to the cross members through fasteners such as screws bolts or other fastening methods known by those skilled in the art. In a preferred example, decking planks 302 are made from RUMBER brand material which is a registered trademark of Rumber Materials, Inc. Rumber is a tough and resilient material made from recycled rubber and plastics. Other materials for example, wood, steel, aluminum, plastic, elastomers and combinations thereof, may be used as known by those skilled in the art.

Referring to the example in FIG. 1, front deck surface 290, main deck surface 294 and rear deck surface 298 are preferably made from Rumber material. The first 46 and second 60 transition portions are preferably decked with steel or other ferrous and non-ferrous materials although other materials noted above may be used.

Referring to FIGS. 3-5, one area of improvement or flexibility in design and manufacturing is shown. As previously disclosed, frame 14 is made from successive first 120 and second 124 cross-members that are spaced along the longitudinal axis 86. These materials are communized, and in one example, form distinct and substantially repetitive modular sections, for example, a modular main deck section 132 and a rear deck section 133. By design, and by using common components, trailer 10 can be scaled in length and weight capability more easily than prior designs. For example, if the trailer 10 illustrated in FIG. 3 were not required at the time of manufacture to require such a long length or need for six tires to support the anticipated load, trailer 10 could be manufactures with one less main deck section 133 or rear deck section 304 to eliminate the unnecessary set of wheels. Since the front deck 40 is able to accommodate different height towing vehicle connection points, the front portion of the trailer including the front deck and first transition portion, could remain substantially the same while significantly altering the rest of the trailer to suit the particular application or performance requirements. Further, the teachings of the present invention are equally applicable to all of the principal forms of heavy commercial trailer configurations including, but not limited to, low-boy, flatbed and drop-style trailer configurations.

Figure 12:
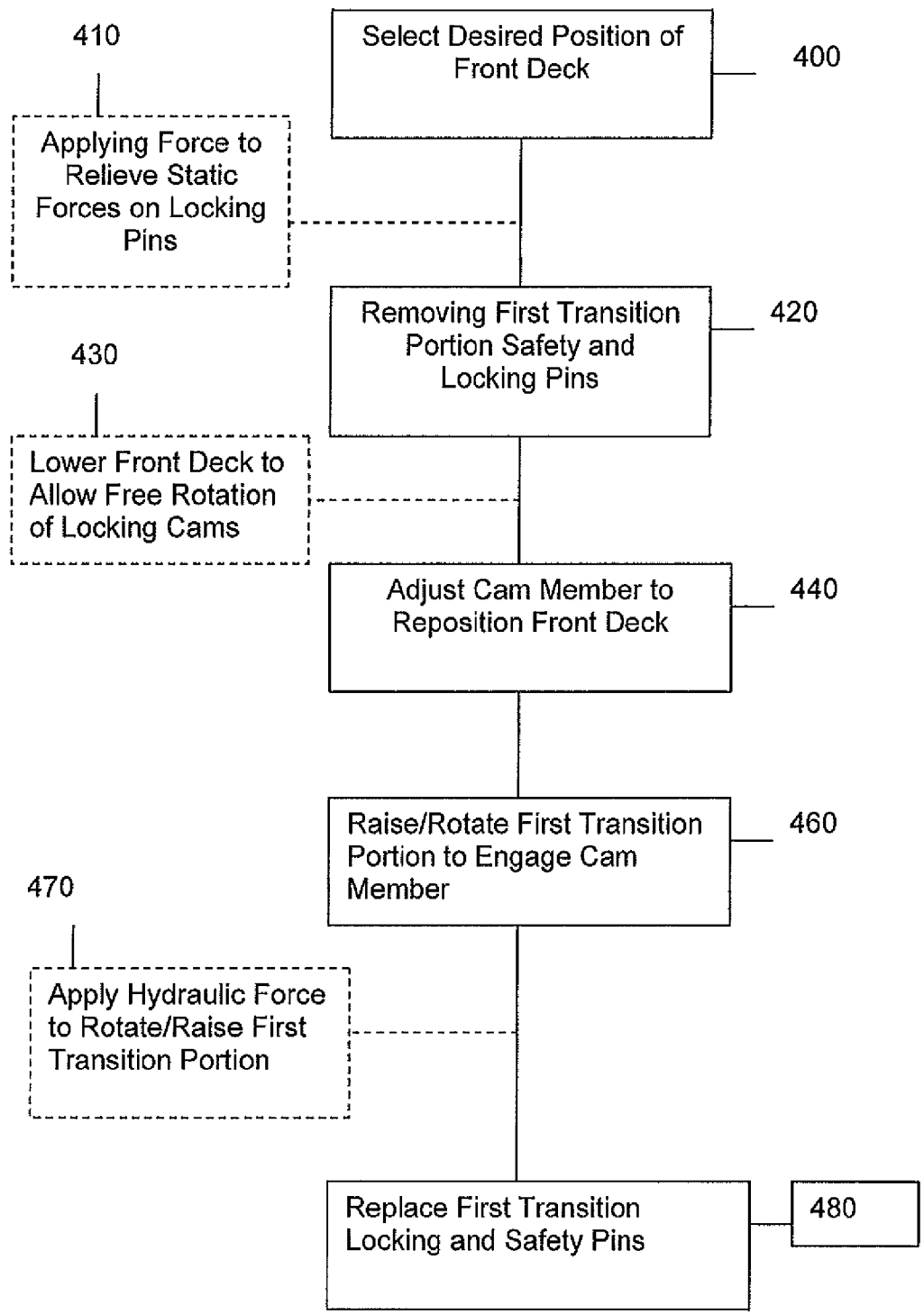
FIG. 12 is a schematic flow chart illustrating an example of method steps to adjust the position of the front deck.

In an example of a method of operation shown in FIG. 12, where it is desired to adjust the vertical position of the trailer kingpin connection point 30 relative to a tow vehicle (not shown), for example to accommodate a tow vehicle with a different connection point height, a first step 400 is to determine the proper position or height of first deck portion 40. A second step step 420 includes removing the safety pin 200 and the locking pin 198 from the locking member 194 on both sides of the trailer (see FIG. 8). In an optional step 430, the first transition portion 46 is lowered so as to allow easy rotation of the cam members 210 to the desired position, for example to selectively position the front deck 40 to accommodate a low, medium or high position of the first transition portion. In examples described above, it will often be desirable to maintain a substantially horizontal position of front deck 40. In other examples, it may be desirable to lower the front deck 40 angularly downward toward the ground to use the front deck as a ramp to load or unload the cargo to and from the trailer 10. Unless otherwise vertically supported, the front deck will begin to lower under the force of gravity unless otherwise restrained. In one example where a hydraulic circuit 264 is used, which includes needle valve 276, resistance from rapid flow of hydraulic fluid will prevent the front deck 40 from rapidly descending. In a third step 440, the cam members 210 are rotated to the desired position through rotation of cam rod 224 which preferably rotates all four of the cams 210 simultaneously. Once repositioned, the cam members 210 are locked in place through locking pins 250 on cam dial 230.

The fourth step 460 raises or rotates the front deck 40 and first transition portion 46 about pivot points 174 until second links 160 abuttingly engage repositioned cam members 210 to a desired or predetermined alternate higher or lower position than the previous position.

In an optional step 470, the raising or rotating of the front deck 40 and first transition portion 46 may be accomplished through activation and movement of the hydraulic actuating mechanism described above and illustrated in FIGS. 7 and 11.

Once the front deck 40 and first transition portion 46 are in their selected positions, step 480 calls for reinstalling the locking pins 198 and safety pins 200 to again lock the first transition portion 46 and front deck 40 from further angular movement relative to main deck 50.

Other variations of the above process, including additional steps and executing the described steps in different order may be used as known by those skilled in the art. For example, the first transition portion 46, through removal of locking 198 and safety 200 pins, can be repositioned and locked back into place then followed by unlocking, movement and relocking the front deck 40 through manipulation of cam dial 230 and cam 210 as generally described.

In an alternate first step 410, the hydraulic actuating mechanism circuit 264 and actuating cylinders 260 can be used to apply an upward force on the first transition portion 46 to relieve at least some, and preferably all, of the static forces of the first transition portion 46 and first deck 40 on the locking pin 198 due to the weight of these components themselves and any cargo that may be positioned thereon. Relieving such forces eases removal of the locking pins and controls any undesired downward movement of the front deck 40 due to gravity. In a variation of step 410, a manual force can be applied to the front deck, for example through an electric or manual winch on the tow vehicle, to raise or move the front deck 40 and first transition portion 46 to relieve the forces on the locking pins 198 and cam members 210.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A towable wheeled trailer for use in supporting and transporting selected cargo thereon, the trailer comprising:
   a frame;
   a front deck portion having a vehicle connection point adapted to be removably connected to a tow vehicle;
   a main deck portion; and
   a first transition portion positioned between the front deck and the main deck, the first transition portion comprising:
   a four-bar linkage having at least two first links and two second links pivotally mounted at respective ends to the frame, the transition portion independently rotatable with respect to the front deck and the main deck to selectively position the height of the trailer vehicle connection point,
   a cam mechanism comprising:
   at least one cam member rotatably connected to the frame about an axis, the cam member having at least a first and a second bearing surface on a periphery thereof for abutting engagement with one of the first or second links of the four bar linkage, the first bearing surface having a different radial distance from the cam member axis of rotation than the second bearing surface to selectively and angularly position the front deck with respect to the first transition portion and the main deck; and
   a cam dial operably connected to the cam member, the cam dial having a dial lever operably connected to the cam member for selective positioning of the cam member in one of the at least two positions thereby defining the angular position of front deck with respect to the first transition portion.

2. The trailer of claim 1 further comprising at least two mounting brackets connected to respective ends of the four bar linkage first and second links, the brackets having a locking device defining at least a first and second position of the links, the first position is angularly distant from the second position with respect to one of the links pivot points.

3. The trailer of claim 2 wherein the locking device comprises a locking pin selectively positionable in at least two concentrically alignable through holes defined by the mounting bracket and one of the links.

4. The trailer of claim 1 wherein the frame further comprises:
   a first support beam centrally positioned along a longitudinal axis of the trailer and terminating at a rear end; and
   a second and third support beam, each second and third support beam having a front portion connected to the terminal rear end of first beam extending angularly away from the longitudinal axis and a rear portion extending substantially parallel to the longitudinal axis and laterally separated from the other rear portion.

5. The trailer of claim 4 further comprising at least a first and a second rear wheel each connected to a trailer suspension mechanism, each trailer suspension mechanism connected to one of the second and third support beams.

6. The trailer of claim 4 further comprising a first and a second truss member, each truss member having first end connected to the trailer vehicle connection point and a second end extending angularly outward from the longitudinal axis and respectively connecting to opposing side rails laterally spaced along a lateral axis of the frame.

7. The trailer of claim 1 wherein the frame further comprises:
   a first support beam extending centrally along a longitudinal axis;
   a pair of opposing side rails positioned substantially parallel to the first beam;
   a plurality of first cross members extending along a lateral axis and connected to the opposing side rails and first beam, the plurality of first cross members spaced apart from one another along the longitudinal axis;
   a plurality of second cross members positioned between respective first cross members and extending along a lateral axis and connected to the opposing side rails and first beam, the plurality of second cross members spaced apart from one another along the longitudinal axis.

8. The trailer of claim 7 wherein a pair of adjacent longitudinally separated first cross members and a plurality of second cross members positioned between the pair of adjacent first cross members forms a frame modular cell, the main deck formed from at least two modular cells, the trailer comprising a selective number of modular cells to selectively define the length of the trailer main deck.

9. The trailer of claim 7 wherein the trailer further comprises a rear deck positioned rearward of the main deck and connected to the main deck, the rear deck including at least two modular cells, each modular cell having a pair of opposing trailer support wheels connected to the cell to selectively define a length of the rear deck and selectively define the number of support wheels.

10. A towable wheeled trailer for use in transporting selected cargo thereon, the trailer comprising:
    a frame having a first support beam positioned centrally down a longitudinal axis and a pair of opposing side rails positioned substantially parallel to the longitudinal axis spaced laterally along a lateral axis;
    a front deck having a tow vehicle connection adapted to be removably connected to a tow vehicle;
    a main deck;
    a transition portion positioned between the front deck and main deck, the transition portion having a four bar linkage connected to the front deck and main deck allowing independent rotation of the front deck and main deck to selectively position the vertical position of the tow vehicle connection;
    at least two mounting brackets connected to respective rearward ends of the four bar linkage, the mounting brackets having three stops defining three angularly separate positions for selectively stationary positions of the transition portion with respect to the main deck; and
    a mechanism for selectively and stationarily positioning the front deck to maintain a substantially parallel and stationary position of the front deck with respect to the main deck, the mechanism comprising:
       a cam member having a plurality of bearing surfaces about a perimeter, each bearing surface having a different radial distance from a pivot point for selectively and angularly positioning the front deck with respect to transition portion; and
       a cam dial in operative connection with the cam member, the cam dial having a cam lever for selectively adjusting the angular position of the front deck with respect to the transition portion thereby selectively defining the vertical position of the tow vehicle connection point.

* * * * *